(12) United States Patent
Jang (10) Patent No.: US 8,503,116 B2
(45) Date of Patent: *Aug. 6, 2013

(54) LENS TRANSFERRING DEVICE

(75) Inventor: Cheol-eun Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

This patent is subject to a terminal disclaimer.

(21) Appl. No.: 12/951,214

(22) Filed: Nov. 22, 2010

(65) Prior Publication Data

US 2011/0122516 A1    May 26, 2011

(30) Foreign Application Priority Data

Nov. 23, 2009  (KR) .................. 10-2009-0113354

(51) Int. Cl.
*G02B 7/08* (2006.01)
(52) U.S. Cl.
CPC ...................................... *G02B 7/08* (2013.01)
USPC ....................................................... 359/823
(58) Field of Classification Search
CPC ................................... G02B 7/04; G02B 7/08
USPC .............................................. 359/819, 823
See application file for complete search history.

(56) References Cited

U.S. PATENT DOCUMENTS

| | | | |
|---|---|---|---|
| 5,150,260 A | 9/1992 | Chigira | |
| 5,377,048 A | 12/1994 | Tada et al. | |
| 6,654,557 B2* | 11/2003 | Kikuchi et al. | 359/823 |
| 7,065,295 B2* | 6/2006 | Jeong et al. | 396/85 |
| 7,782,548 B2* | 8/2010 | Yumiki et al. | 359/698 |
| 2005/0168847 A1* | 8/2005 | Sasaki | 359/823 |
| 2008/0198486 A1 | 8/2008 | Wakamizu et al. | |

FOREIGN PATENT DOCUMENTS

JP    2725491 B2    3/1998

\* cited by examiner

*Primary Examiner* — Zachary Wilkes
(74) *Attorney, Agent, or Firm* — Drinker Biddle & Reath LLP (57) ABSTRACT

Provided is a lens transferring device including a lens mounting member to which at least one lens is installed; a guiding member that guides movement of the lens mounting member; a driver that moves the lens mounting member and includes a lead screw; an operation member installation unit that is formed at an end of the lens mounting member; an operation member that includes a screw unit contacting the lead screw, an installation unit installed to the operation member installation unit, and a connection unit connecting the screw unit and the installation unit; and an elastic member including a first end that contacts the installation unit and a second end that contacts the operation member installation unit, wherein a first propping member that contacts a portion of the installation unit and prevents tilting of the operation member is formed on the operation member installation unit.

7 Claims, 7 Drawing Sheets

LENS TRANSFERRING DEVICE

CROSS-REFERENCE TO RELATED PATENT APPLICATION

This application claims the benefit of Korean Patent Application No. 10-2009-0113354, filed on Nov. 23, 2009, in the Korean Intellectual Property Office, the disclosure of which is incorporated herein in its entirety by reference.

BACKGROUND

The invention relates to a lens transferring device, and more particularly, to a lens transferring device that may be used in image capturing apparatuses, such as a camera and a camcorder.

When such an image capturing apparatus performs focusing or zooming operations, a lens may be moved during such operations. In this case, a device for transferring a lens along a light axis is necessary.

A conventional lens transferring device generally includes a lens frame for holding a lens, a guiding means for guiding transfer of the lens frame, and a transferring means for transferring the lens frame in along a light axis. Various types of lens transferring devices have been developed for image capturing devices having various structures.

Especially due to recent popularization of small mobile image capturing devices, such as digital cameras, lens transferring devices, which occupy less space in image capturing devices and operate stably, are being developed.

SUMMARY

Various embodiments of the invention provide a lens transferring device for preventing a lens from being tilted.

According to an embodiment of the invention, there is provided a lens transferring device including a lens mounting member to which at least one lens is installed; a guiding member that guides movement of the lens mounting member; a driver that moves the lens mounting member and includes a lead screw; an operation member installation unit that is formed at an end of the lens mounting member; an operation member that includes a screw unit contacting the lead screw, an installation unit installed to the operation member installation unit, and a connection unit connecting the screw unit and the installation unit; and an elastic member including a first end that contacts the installation unit and a second end that contacts the operation member installation unit, wherein a first propping member that contacts a portion of the installation unit and prevents tilting of the operation member is formed on the operation member installation unit.

At least one guiding hole is formed in the lens mounting unit, and the guiding member may be inserted into the guiding hole and guides movement of the lens mounting unit.

The driver may include a driving motor. The installation unit may include shafts arranged on two opposite ends of the installation member; and an intermediate unit that is disposed between the shafts and contacts the first propping member. The intermediate unit may have a cylindrical shape. Installation holes are formed in the operation member installation unit, and the shafts may be rotatably inserted into the installation holes. A holding unit that holds an end of the elastic member may be formed on the intermediate unit. At least one second propping member that prevents tilting of the operation member by contacting a portion of the connection unit may be formed on the operation member installation unit. The elastic member may include the shape of a torsion coil spring. The elastic member may include both the shape of a compression coil spring and the shape of a torsion coil spring.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

Hereinafter, the invention will be described in detail by explaining preferred embodiments of the invention with reference to the attached drawings.

Figure 1:
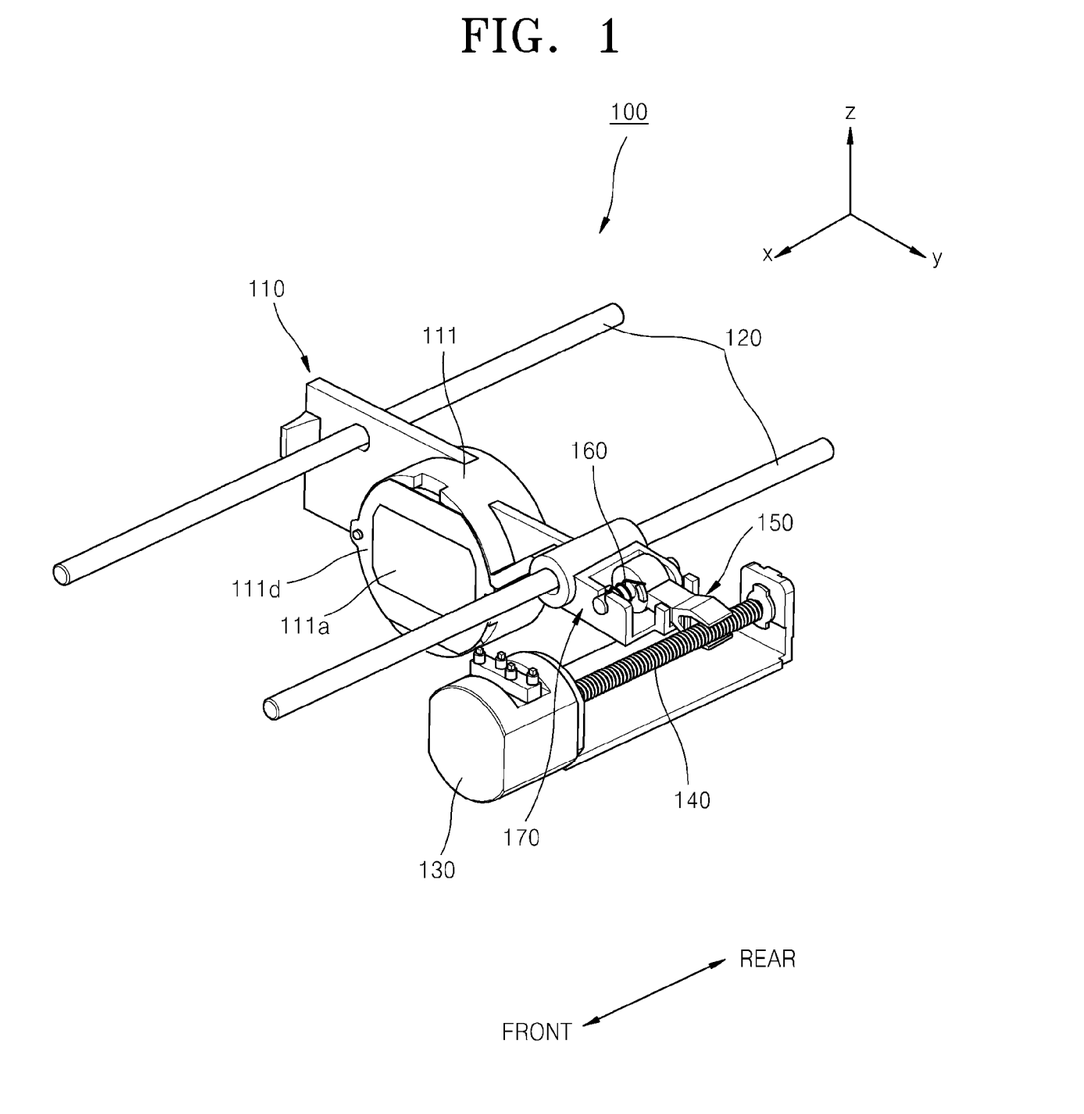
FIG. 1 is a perspective view of a lens transferring device according to an embodiment of the invention.
Figure 2:
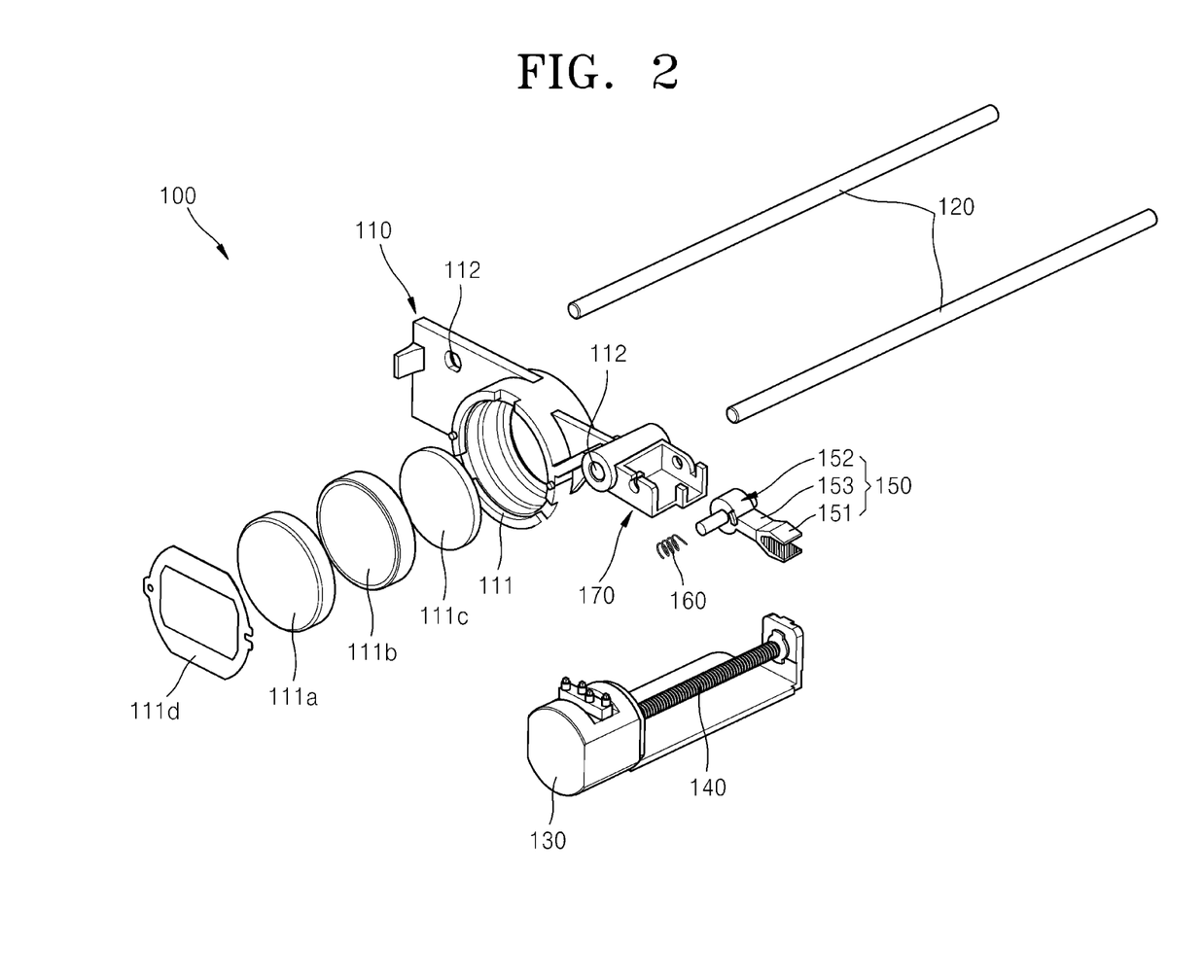
FIG. 2 is an exploded perspective view of the lens transferring device shown in FIG. 1.

FIG. 1 is a perspective view of a lens transferring device 100 according to an embodiment of the invention, and FIG. 2 is an exploded perspective view of the lens transferring device 100 shown in FIG. 1.

Referring to FIGS. 1 and 2, the lens transferring device 100 according to the present embodiment includes a lens mounting member 110, guiding members 120, a driving motor 130, a lead screw 140, an operation member 150, an elastic member 160, and an operation member installation unit 170.

The lens transferring device 100 according to the present embodiment is installed within a camera. However, the invention is not limited thereto. In other words, the lens transferring device 100 according to the invention may be applied to any of various devices requiring a movable lens, such as a camcorder, a projector, and an integrated camera of a handheld phone, or other similar devices.

The lens mounting member 110 includes a lens mounting unit 111, and a pair of guiding holes 112 are formed in the lens mounting member 110.

Lenses 111a, 111b, and 111c and a mask 111d are installed in the lens mounting unit 111.

The lenses 111a, 111b, and 111c transmit image light, and the mask 111d fixes the lenses 111a, 111b, and 111c to the lens mounting unit 111 and protects the lenses 111a, 111b, and 111c.

According to the present embodiment, the three lenses 111a, 111b, and 111c are installed to the lens mounting unit 111. However, the invention is not limited thereto. In other words, any number of lenses may be installed to the lens mounting unit 111. For example, either one lens may be installed to the lens mounting unit 111 or four or more lenses may be installed to the lens mounting unit 111.

According to the present embodiment, the mask 111d is installed to the lens mounting unit 111. However, the invention is not limited thereto. In other words, a mask may not be installed to the lens mounting unit 111. In this case, another way for fixing lenses to the lens mounting unit 111, such as an adhesive, may be used.

The guiding holes 112 are symmetrically formed and the guiding members 120 are inserted into the guiding holes 112 in order to guide directions in which the lens mounting member 110 may move.

According to the present embodiment, the guiding holes 112 are formed in the lens mounting member 110. However, the invention is not limited thereto. In other words, instead of the guiding holes 112, guiding grooves may be formed to guide directions in which the lens mounting member 110 may move.

The guiding members 120 may be formed as rods having circular cross-sections. Therefore, ends of the guiding members 120 may be fixed to a casing or frame of a camera in which the lens transferring device 100 is employed.

Appropriate clearances are formed between inner sidewalls of the guiding holes 112 and outer surfaces of the guiding members 120, such that the lens mounting member 110 may move while guided by the guiding member 120.

In other words, diameters of the guiding holes 112 should be greater than the diameters of the guiding member 120, so that the guiding members 120 may be inserted into the guiding holes 112, and the lens mounting member 110 may slide smoothly. However, if the diameters of the guiding holes 112 are significantly greater than the diameters of the guiding members 120, the lens mounting member 110 may wobble when the lens mounting member 110 is moved, and thus the quality of a captured image is deteriorated. Therefore, in reality, the appropriate clearances between the guiding holes 112 and the guiding members 120 should be determined via experiments and reflected in the designs of the guiding holes 112 and the guiding members 120.

Although the guiding members 120 according to the present embodiment are formed as rods having circular cross-sections, the invention is not limited thereto. In other words, the guiding members 120 according to the invention may have any of various shapes. For example, the guiding members 120 may be formed as rods having rectangular or any other shaped cross-sections.

According to the present embodiment, although a pair of the guiding members 120 and a pair of the guiding holes 120 are shown, the invention is not limited thereto. In other words, according to the invention, any number of the guiding members 120 and any number of the guiding holes 120 may be formed. For example, three guiding members and three guiding holes may be formed.

The driving motor 130 moves the lens mounting member 110 according to a control signal of a control unit (not shown) of a camera. In other words, it is configured such that a shaft of the driving motor 130 rotates clockwise or counterclockwise according to the control signal of the control unit.

The driving motor 130 may be a general motor, or may be a geared motor.

The lead screw 140 is installed to the shaft of the driving motor 130. Therefore, the lead screw 140 rotates as the driving motor 130 operates.

A screw thread formed on an outer surface of the lead screw 140 together with a screw unit 151 of the operation member 150 forms a power transmission structure, and the power transmission structure converts rotation of the lead screw 140 into linear motion of the lens mounting member 110.

Next, referring to FIGS. 3 through 6, the operation member 150, the elastic member 160, and the operation member installation unit 170 will be described in details.

Figure 3:
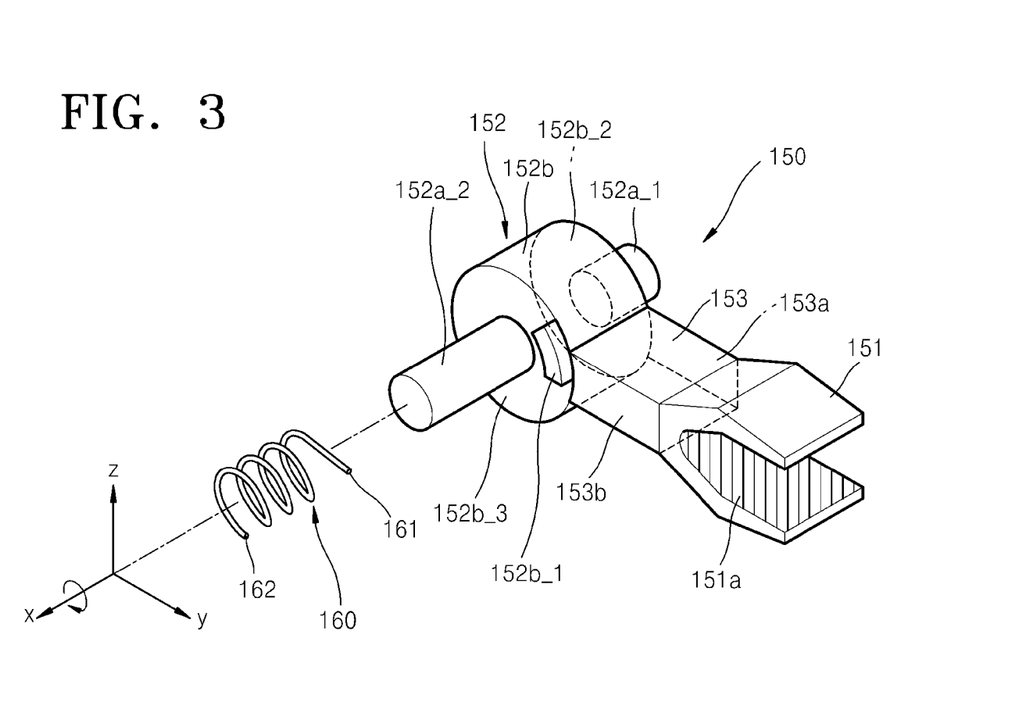
FIG. 3 is a perspective view of an operation member and an elastic member according to an embodiment of the invention.
Figure 4:
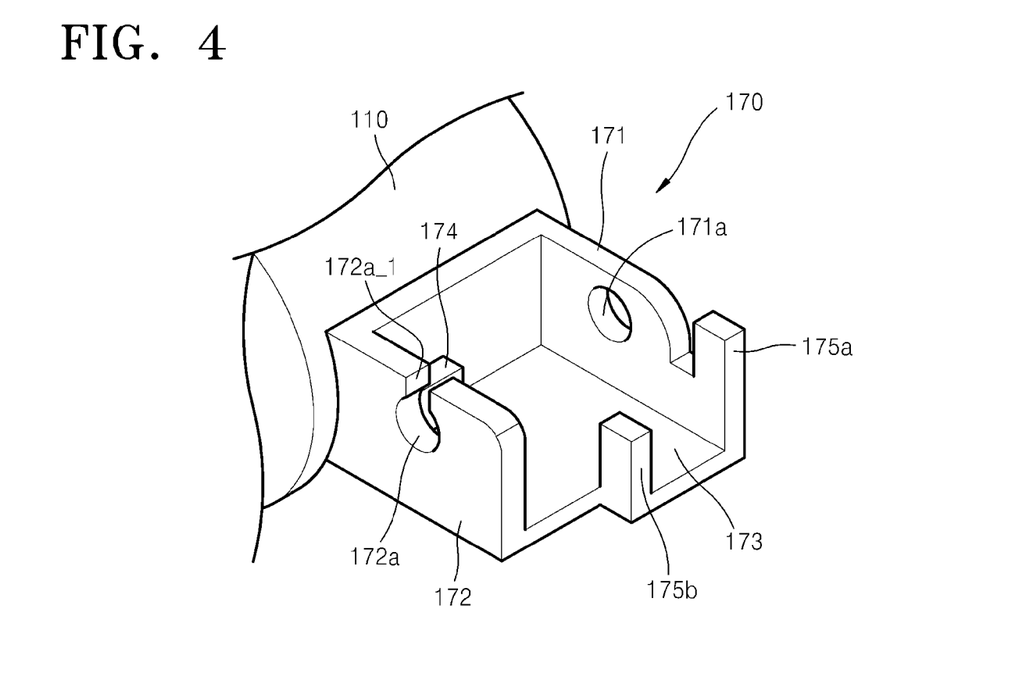
FIG. 4 is a perspective view of an operation member installation unit according to an embodiment of the invention.
Figure 5:
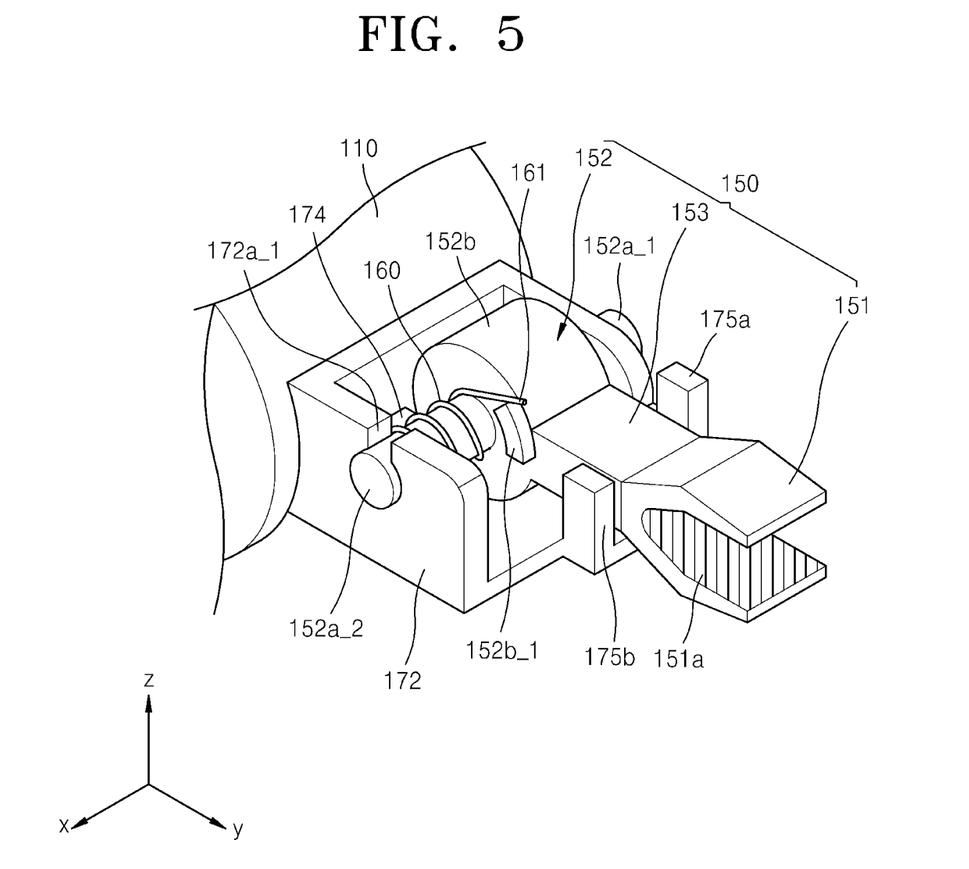
FIG. 5 is a perspective view showing an operation member and an elastic member installed to an operation member installation unit.

FIG. 3 is a perspective view of the operation member 150 and the elastic member 160 according to an embodiment of the invention. FIG. 4 is a perspective view of the operation member installation unit 170 according to an embodiment of the invention. FIG. 5 is a perspective view showing the operation member 150 and the elastic member 160 installed to the operation member installation unit 170.

Figure 6:
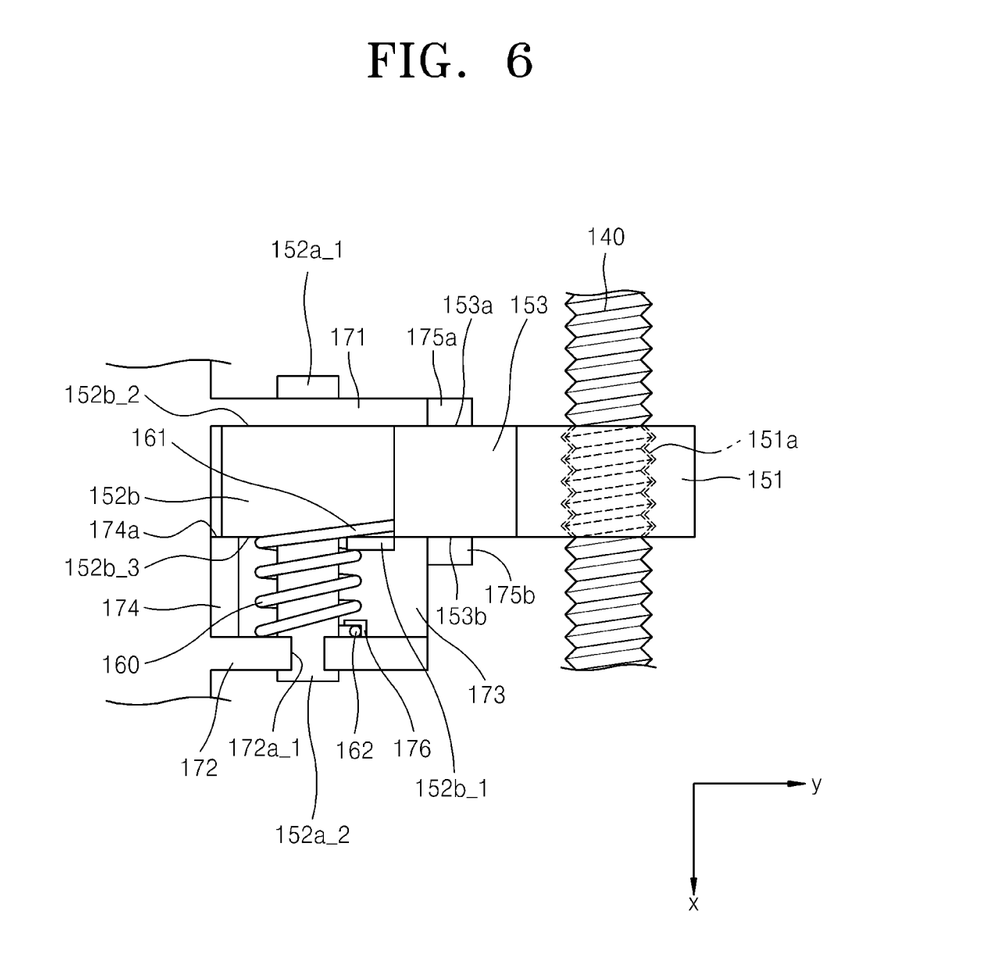
FIG. 6 is a plan view of the power transmission structure including a lead screw and an operation member.

FIG. 6 is a plan view of the power transmission structure including the lead screw 140 and the operation member 150.

The operation member 150 receives driving force from the lead screw 140 to move the lens mounting member 110, and includes the screw unit 151, an installation unit 152, and a connection unit 153.

As shown in FIG. 3, the screw unit 151 is formed to have a "U" shape, and a screw thread 151a is formed on inner surfaces of the screw unit 151.

The screw thread 151a of the screw unit 151 contacts the screw thread formed on the outer surface of the lead screw 140. Therefore, when the lead screw 140 rotates, the screw unit 151 may move in a straight line along the screw thread of the lead screw 140.

The installation unit 152 is a unit installed to the operation member installation unit 170, and includes shafts 152a_1 and 152a_2 and an intermediate unit 152b between the shafts 152a_1 and 152a_2.

The shafts 152a_1 and 152a_2 are formed as pins, and the shafts 152a_1 and 152a_2 are respectively inserted into first and second installation holes 171a and 172a formed in the operation member installation unit 170, so that the operation member 150 may rotate.

The intermediate unit 152b is formed as a cylinder having a diameter greater than diameters of the shafts 152a_1 and 152a_2, and a holding unit 152b_1 that holds an end 161 of the elastic member 160 is formed on the intermediate unit 152b.

Furthermore, the intermediate unit 152b includes a first surface 152b_2 and a second surface 152b_3. The second surface 152b_3 is opposite to the first surface 152b_2. The first surface 152b_2 is formed to face a first supporting unit 171 of the operation member installation unit 170, whereas the second surface 152b_3 is formed to face a second supporting unit 172 of the operation member installation unit 170.

The connection unit 153 is a unit connecting the screw unit 151 and the installation unit 152, and includes a first surface 153a that is formed to face the first supporting unit 171 and a second surface 153b that is formed opposite to the first surface 153a.

As shown in FIG. 3, the elastic member 160 is designed to be both a compression coil spring and a torsion coil spring, and thus the elastic member 160 has both compression elasticity in a lengthwise direction (an x-axis direction) and elasticity in a torsional direction of torsion (a direction around the x-axis). In other words, referring to the structure and the location of the elastic member 160, it is clear that the elastic member 160 exerts both compression elasticity for pushing the intermediate unit 152b toward the first supporting unit 171 and torsional elasticity for pushing the screw unit 151 toward a base unit 173 of the operation member installation unit 170.

The elastic member 160 is configured to be inserted along the shaft 152a_2, where the first end 161 of the elastic member 160 is held by the holding unit 152b_1 of the intermediate unit 152b, and a second end 162 of the elastic member 160 is fixed to an elastic member fixing unit 176 (refer to FIG. 6) disposed nearby the second installation hole 172a of the second supporting unit 172.

However, the elastic member 160 may be designed to have only the function of a torsion coil spring without the function of a compression coil spring.

As shown in FIG. 4, the operation member installation unit 170 is formed at a side of the lens mounting member 110, and the operation member 150 and the elastic member 160 are installed in the operation member installation unit 170.

The operation member installation unit 170 includes the first supporting unit 171, the second supporting unit 172, the base unit 173, a first propping member 174, and second propping members 175a and 175b.

The first and second supporting units 171 and 172 are arranged to face each other, wherein the first installation hole 171a and the second installation hole 172a are formed on the first supporting unit 171 and the second supporting unit 172, respectively.

The first installation hole 171a and the second installation holes 172a are formed to face each other, and the shaft 152a_1 is rotatably inserted into the first installation hole 171a and the shaft 152a_2 is rotatably inserted into the second installation hole 172a.

The second installation hole 172 includes an opening 172a_1. The second installation hole 172 has the partially opened structure for easy installation of the shaft 152a_2. In other words, although the size of the opening 172a_1 is smaller than that of the shaft 152a_2, the diameter of the opening 172a_1 is sufficient for the shaft 152a_2 to pass through the opening 172a_1 when the opening 172a_1 is elastically deformed. Therefore, a manufacturer may easily install the installation unit 152 to the operation member installation unit 170 via the opening 172a_1.

According to the present embodiment, the second installation hole 172a includes the opening 172a_1. However, the invention is not limited thereto. In other words, the shape of the second installation hole 172a may be the same as the shape of the first installation hole 171a.

The base unit 173 connects the first supporting unit 171 and the second supporting unit 172, and forms a bottom surface of the operation member installation unit 170.

The first propping member 174 is installed inside the operation member installation unit 170, wherein the first propping member 174 has a hexahedral shape.

As shown in FIG. 6, the first supporting unit 171 contacts the first surface 152b_2 of the intermediate unit 152b, and a first surface 174a of the first propping member 174 contacts the second surface 152b_3 of the intermediate unit 152b. Such a configuration prevents rotating and tilting of the operation member 150 around an z-axis and rotating and tilting of the operation member 150 around a y-axis.

The first propping member 174 according to the present embodiment has a hexahedral shape. However, the invention is not limited thereto. In other words, the first propping member 174 may have any of various shapes as long as the first propping member 174 is capable of preventing tilting of the operation member 150 by contacting the second surface 152b_3 of the intermediate unit 152b.

Furthermore, the second propping members 175a and 175b are installed to the operation member installation unit 170 and restrict movement of the connection unit 153.

In other words, the second propping member 175a is installed to a location of the operation member installation unit 170, the location facing the first surface 153a of the connection unit 153, whereas the second propping member 175b is installed to a location of the operation member installation unit 170, the location facing the second surface 153b of the connection unit 153.

The second propping member 175a contacts the first surface 153a of the connection unit 153 and the second propping member 175b contacts the second surface 153b of the connection unit 153. Thus, rotating and tilting of the operation member 150 around the z-axis and rotating and tilting of the operation member 150 around the y-axis are prevented.

According to the present embodiment, there are two second propping members 175a and 175b. However, the invention is not limited thereto—any number of second propping members may be used.

Hereinafter, operations of the lens transferring device 100 according to the present embodiment will be described with reference to FIGS. 6 through 8.

When a control unit (not shown) of a camera drives the driving motor 130, the lead screw 140 rotates. When the lead screw 140 rotates, the operation member 150, which contact the screw thread of the lead screw 140, receives driving force from the screw thread of the lead screw 140.

In other words, driving force is transmitted from the screw thread of the lead screw 140 to the screw thread of the screw unit 151 of the operation member 150. Here, a tilting force is applied to the operation member 150 due to the tolerance between the contacting screws threads. However, according to the present embodiment, the first propping member 174 contacts the intermediate unit 152b and prevents tilting of the operation member 150, and the second propping members 175a and 175b contact the connection unit 153 and also prevents tilting of the operation member 150. The operation member 150 may move while tilting of the operation member 150 is prevented, and the operation member 150 may not tilt even after the movement of the operation member 150 is completed. Therefore, the operation member installation unit 170 and the lens mounting member 110 may move front and rear while tilting of the operation member installation unit 170 and the lens mounting member 110 is prevented.

Figure 7:
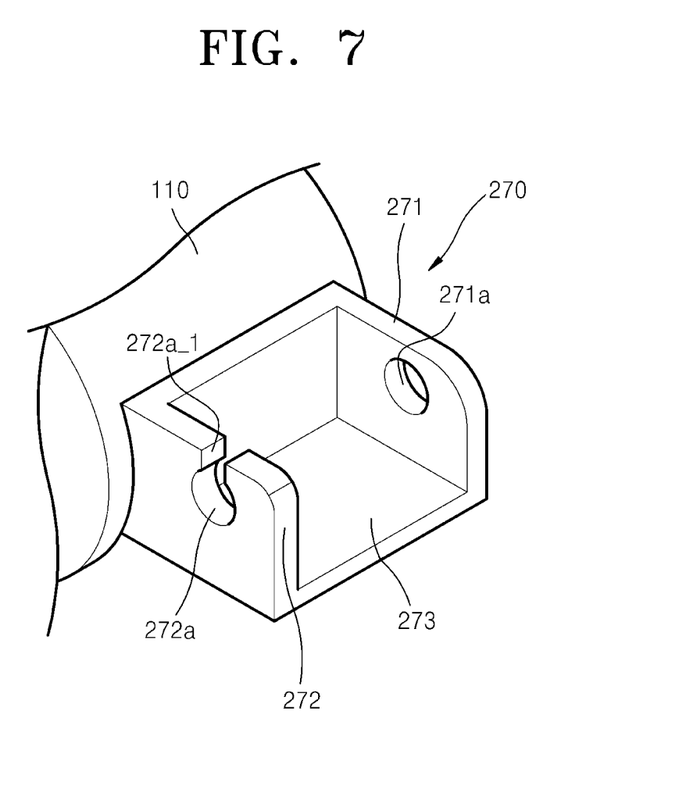
FIG. 7 is a perspective view of an operation member installation unit according to the comparative embodiment.
Figure 8:
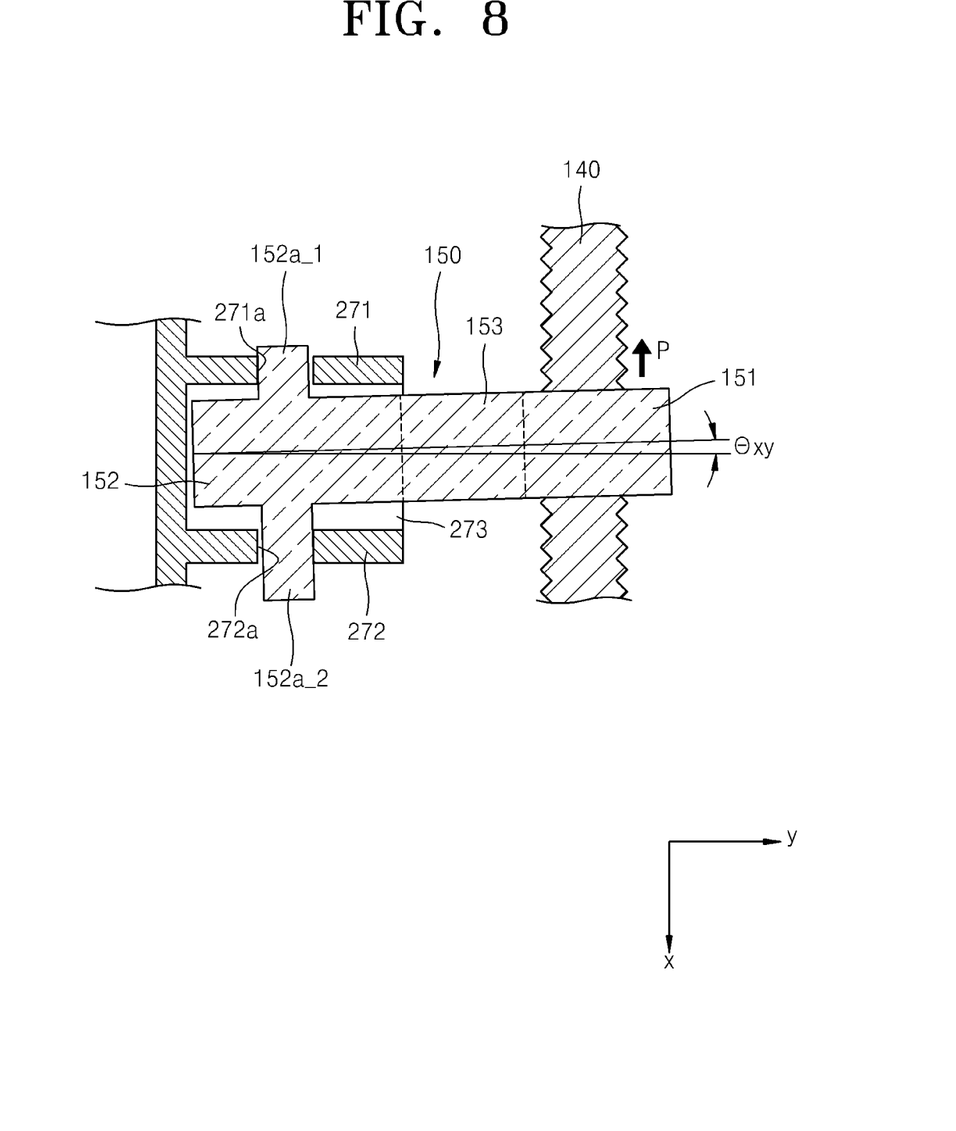
FIG. 8 is a sectional view of a lens transferring device including the operation member installation unit of FIG. 7.

For convenience of explanation, referring to FIGS. 7 and 8, the present embodiment will be compared to a comparative embodiment.

FIG. 7 is a perspective view of an operation member installation unit 270 according to the comparative embodiment, and FIG. 8 is a sectional view of a lens transferring device including the operation member installation unit 270 of FIG. 7.

The configuration of the lens transferring device according to the comparative embodiment is identical to that of the lens transferring device 100 according to the present embodiment except that the configuration of the operation member installation unit 270 is different from the configuration of the operation member installation unit 170. That is, as shown in FIG. 7, the operation member installation unit 270 according to the comparative embodiment includes no configuration corresponding to the first propping member 174 and the second propping members 175a and 175b according to the present embodiment. In other words, the operation member installation unit 270 according to the comparative embodiment includes a first supporting unit 271, a first installation hole 271a, a second supporting unit 272, a second installation hole 272a, an opening 272a_1, and a base unit 273.

As shown in FIG. 8, when the lead screw 140 rotates, the operation member 150 contacting the screw thread of the lead screw 140 receives driving force from the screw thread of the lead screw 140.

In other words, driving force is transmitted from the screw thread of the lead screw 140 to the screw thread of the screw unit 151 of the operation member 150, and a tilting force P is applied to the operation member 150 due to the tolerances of the screws. However, since the operation member installation unit 270 according to the comparative example includes no configuration corresponding to the first propping member 174 and the second propping members 175a and 175b according to the present embodiment, the operation member 150 may be tilted by an angle $\theta_{xy}$. Although FIG. 8 shows that the tilting angle $\theta_{xy}$ is with respect to the x-y plane for convenience of explanation, the tilting force P may not only be applied in the x-axis direction, and the tilting force P may be applied in a complex manner, and thus the tilting angle $\theta_{xy}$ may be expressed with respect to various axes.

Unlike in the comparative embodiment as described above, the present embodiment provides the first propping member 174 and the second propping members 175a and 175b, and thus the operation member 150 and the lens mounting member 110 do not tilt when a lens is being moved or after the lens is moved.

In other words, the lens mounting member 110 is not tilted according to the present embodiment. Therefore, tilting of the lenses 111a, 111b, and 111c may be prevented. Furthermore, since tilting and vibrations of the lenses 111a, 111b, and 111c are minimized, the quality of a capture image may be improved.

Furthermore, according to the present embodiment, since tilting of the lenses 111a, 111b, and 111c may be prevented while the lenses 111a, 111b, and 111c are being moved, the lenses 111a, 111b, and 111c may be controlled to be positioned precisely and quickly.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

What is claimed is:

1. A lens transferring device comprising:
    a lens mounting member to which at least one lens is installed;
    a guiding member that guides movement of the lens mounting member;
    a driver that moves the lens mounting member and includes a lead screw;
    an operation member installation unit that is formed at an end of the lens mounting member and has first and second end portions;
    an operation member that includes a screw unit that contacts the lead screw, an installation unit that has first and second end portions and is installed to the operation member installation unit, and a connection unit connecting the screw unit and the installation unit; and
    an elastic member including a first end that contacts the installation unit and a second end that contacts the operation member installation unit, wherein the elastic member is configured in both a shape of a compression coil spring and a shape of a torsion coil spring and exerts both compression elasticity that pushes the operation member with respect to the operation member installation unit, and torsional elasticity that pushes the screw unit toward a base unit of the operation member installation unit;
    wherein the connection unit extends from the operation member installation unit toward the lead screw to connect the screw unit and the installation unit,
    a first propping member that contacts the first end portion of the installation unit, while the operation member moves along the lead screw and prevents tilting of the operation member, is formed on the first end portion of the operation member installation unit, and
    at least one second propping member is formed on the second end of the operation member installation unit, protrudes toward the screw unit further than the second end portion of the installation unit, contacts a portion of the connection unit, and prevents tilting of the operation member.

2. The lens transferring device of claim 1, wherein at least one guiding hole is formed in the lens mounting unit, and the guiding member is inserted into the guiding hole and guides movement of the lens mounting unit.

3. The lens transferring device of claim 1, wherein the driver comprises a driving motor.

4. The lens transferring device of claim 1, wherein the installation unit comprises:
   shafts arranged on two opposite ends of the installation unit; and
   an intermediate unit that is disposed between the shafts and contacts the first propping member.

5. The lens transferring device of claim 4, wherein the intermediate unit has a cylindrical shape.

6. The lens transferring device of claim 4, wherein installation holes are formed in the operation member installation unit, and the shafts are rotatably inserted into the installation holes.

7. The lens transferring device of claim 4, wherein a holding unit that holds an end of the elastic member is formed on the intermediate unit.

\* \* \* \* \*